(12) United States Patent
Kim et al.

(10) Patent No.: US 11,966,317 B2
(45) Date of Patent: Apr. 23, 2024

(54) ELECTRONIC DEVICE AND METHOD FOR CONTROLLING SAME

(71) Applicant: SAMSUNG ELECTRONICS CO., LTD., Suwon-si (KR)

(72) Inventors: Yehoon Kim, Suwon-si (KR); Chanwon Seo, Suwon-si (KR); Sojung Yun, Suwon-si (KR); Junik Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 16/768,452

(22) PCT Filed: Dec. 26, 2018

(86) PCT No.: PCT/KR2018/016623
§ 371 (c)(1),
(2) Date: May 29, 2020

(87) PCT Pub. No.: WO2019/135534
PCT Pub. Date: Jul. 11, 2019

(65) Prior Publication Data
US 2020/0371895 A1    Nov. 26, 2020

(30) Foreign Application Priority Data

Jan. 5, 2018 (KR) .................. 10-2018-0001692

(51) Int. Cl.
*G06F 15/173* (2006.01)
*G06F 11/34* (2006.01)
*G06N 3/08* (2023.01)

(52) U.S. Cl.
CPC ........... *G06F 11/3438* (2013.01); *G06N 3/08* (2013.01)

(58) Field of Classification Search
CPC ..... H04L 43/04; H04L 67/30; H04L 67/1036; H04L 67/22; H04L 67/1063; G06N 5/04;
(Continued)

(56) References Cited

U.S. PATENT DOCUMENTS 8,909,370 B2    12/2014   Stiehl et al.
10,534,900 B2    1/2020   Cheong et al.
(Continued)

FOREIGN PATENT DOCUMENTS

CN    105431820    3/2016
CN    105677333    6/2016
(Continued)

OTHER PUBLICATIONS

Office Action dated Feb. 5, 2021 in counterpart Chinese Patent Application No. 201880085453.5 and English-language translation.
(Continued)

*Primary Examiner* — Lan Dai T Truong
(74) *Attorney, Agent, or Firm* — Nixon & Vanderhye, P.C.

(57) ABSTRACT

An electronic device and a method for controlling the same are disclosed. The method for controlling an electronic device according to the present disclosure comprises the steps of: detecting at least one user and acquiring user information of the detected at least one user; determining a user mode on the basis of the acquired user information; determining a service to be provided to the detected at least one user, by inputting the user information and the determined user mode as input data to a model learned by an artificial intelligence algorithm; and providing the determined service corresponding to the user mode. A method for providing the service by the electronic device may at least
(Continued)

partially use an artificial intelligence model learned according to at least one of machine learning, neural network, and deep learning algorithms.

24 Claims, 12 Drawing Sheets

(58) Field of Classification Search
CPC ......... G06N 3/08; G06N 5/022; H04M 1/725; G06F 11/3438
USPC ....................................................... 709/224
See application file for complete search history.

(56) References Cited

U.S. PATENT DOCUMENTS

| | | | |
|---|---|---|---|
| 2010/0185328 | A1 | 7/2010 | Kim et al. |
| 2015/0066158 | A1* | 3/2015 | Kim ..................... H04L 12/283 700/3 |
| 2015/0326454 | A1* | 11/2015 | Geis ........................ H04L 43/04 709/226 |
| 2016/0105308 | A1* | 4/2016 | Dutt ..................... H04L 41/083 709/221 |
| 2016/0199977 | A1 | 7/2016 | Breazeal |
| 2017/0010677 | A1* | 1/2017 | Roh ......................... G06F 1/163 |
| 2017/0140285 | A1* | 5/2017 | Dotan-Cohen ........... G06F 3/01 |
| 2017/0358201 | A1* | 12/2017 | Govers ................. G08B 29/188 |
| 2019/0087887 | A1* | 3/2019 | Westphal ........... G06Q 30/0631 |
| 2019/0095775 | A1* | 3/2019 | Lembersky ............ G06N 3/006 |
| 2019/0176333 | A1* | 6/2019 | Hager, IV ............ G05D 1/0214 |
| 2020/0371895 | A1* | 11/2020 | Kim ...................... H04M 1/725 |
| 2021/0170585 | A1* | 6/2021 | Kim ....................... G06N 7/005 |

FOREIGN PATENT DOCUMENTS

| | | |
|---|---|---|
| CN | 105975622 | 9/2016 |
| CN | 106897404 | 6/2017 |
| JP | 2002-355779 | 12/2002 |
| JP | 4565196 | 10/2010 |
| JP | 2016-48417 | 4/2016 |
| KR | 10-0905523 | 7/2009 |
| KR | 10-2010-0086262 | 7/2010 |
| KR | 10-1126524 | 3/2012 |
| KR | 10-2013-0071755 | 7/2013 |
| KR | 10-2014-0058860 | 5/2014 |
| KR | 10-1413558 | 8/2014 |
| KR | 10-2015-0099430 | 8/2015 |
| KR | 10-2015-0137307 | 12/2015 |
| KR | 10-1772583 | 8/2017 |
| WO | 01/61505 | 8/2001 |
| WO | 2015/034295 | 3/2015 |

OTHER PUBLICATIONS

Scott W. Ambler, "Mapping objects to relational databases", IBM, developerWorks, Jul. 1, 2000, 10 pages.
Sean Andrist, et al., "Conversational Gaze Aversion for Humanlike Robots", ResearchGate, HRI '14 Proceedings of the 2014 ACM/IEEE international conference on Human-robot interaction, Mar. 2014, 9 pages.
Sean Andrist, et al., "Look Like Me: Matching Robot Personality via Gaze to Increase Motivation", CHI '15, Proceedings of the 33rd Annual ACM Conference on Human Factors in Computing Systems, Apr. 2015, 10 pages.
Jong-Hwan Kim, et al., "Two-Layered Confabulation Architecture for an Artificial Creature's Behavior Selection", IEEE Transactions on Systems, Man and Cybernetics—Part C: Applications and Reviews, vol. 38, No. 6, Nov. 2008, 7 pages.
Maximilian Nickel, et al., "A Review of Relational Machine Learning for Knowledge Graphs", Proceedings of the IEEE, Sep. 28, 2015, 23 pages.
Adrià Recasens, et al., "Where are they looking?", Advances in Neural Information Processing Systems 28, Curran Associates, Inc., 2015, 9 pages.
Adam Santoro, et al., "A simple neural network module for relational reasoning", 31st Conference on Neural Information Processing Systems, NIPS, 2017, 10 pages.
Aaron P. Shon, et al., "Probabilistic Gaze Imitation and Saliency Learning in a Robotic Head", May 2005, 6 pages.
Zeynep Yücel, et al., "Joint Attention by Gaze Interpolation and Saliency", IEEE Transactions on Cybernetics, vol. 43, No. 3, Jun. 2013, pp. 829-842.
International Search Report for PCT/KR2018/016623 dated Apr. 9, 2019, 5 pages with English Translation.
Written Opinion of the ISA for PCT/KR2018/016623 dated Apr. 9, 2019, 13 pages with English Translation.
Notice of Allowance dated Dec. 3, 2021 in counterpart Chinese Patent Application No. 201880085453.5 and English-language translation.
Notice of Preliminary Rejection dated Dec. 23, 2021 in counterpart Korean Patent Application No. 10-2018-0001692 and English-language translation.
Notice of Decision of Rejection dated Jun. 27, 2022 in counterpart Korean Patent Application No. 10-2018-0001692 and English-language translation.
Office Action dated Nov. 8, 2022 in KR Application No. 10-2018-0001692 and English-language machine translation.
Office Action dated Sep. 20, 2023 in CN Application No. 202210152977.X and English-language translation.
Office Action dated Oct. 31, 2023 in counterpart Korean Patent Application No. 10-2023-0017619 and English-language translation.

* cited by examiner

ELECTRONIC DEVICE AND METHOD FOR CONTROLLING SAME

This application is the U.S. national phase of International Application No. PCT/KR2018/016623 filed Dec. 26, 2018 which designated the U.S. and claims priority to KR Patent Application No. 10-2018-0001692 filed Jan. 5, 2018, the entire contents of each of which are hereby incorporated by reference.

FIELD

The disclosure relates to an electronic device capable of providing a service based on a relationship between users and a method for controlling the same. More particularly, the electronic device may provide a service suitable to an action of a single user or understand a relationship between a plurality of users and provide a service suitable to the plurality of users.

In addition, the disclosure relates to an artificial intelligence (AI) system simulating functions of the human brain such as recognition or determination using a machine learning algorithm, and an application thereof.

DESCRIPTION OF RELATED ART

The artificial intelligence (AI) system is a computer system with intelligence of a human level and in which a machine trains, determines, and becomes smart, itself, unlike the conventional rule-based smart system. As the artificial intelligence system is used, a recognition rate is improved and preferences of a user can be more accurately understood, and thus, the conventional rule-based smart system is gradually being replaced with the deep learning-based artificial intelligence system.

The artificial intelligence technologies are composed of machine learning (e.g., deep learning) and elementary technologies using the machine learning. The machine learning is an algorithm technology of self-classifying/self-training features of input data, and the elementary technology is a technology using the machine learning algorithm such as the deep learning and is composed of technical fields of language understanding, visual understanding, inference/prediction, knowledge representation, operation control, and the like.

Various fields, to which the artificial intelligence technologies are applied, are as follows. The language understanding is a technology of recognizing languages/alphabets of human and applying/processing it and includes natural language processing, machine translation, a conversion system, question and answer, voice recognition/synthesis, and the like. The visual understanding is a technology of recognizing an object in a view of human and processing it and includes object recognition, object tracking, image searching, human recognition, scene understanding, space understanding, image improvement, and the like. The inference/prediction is a technology of identifying the information and logically inferring and predicting it and includes knowledge/possibility-based inference, optimization prediction, preference-based planning, recommendation, and the like. The knowledge representation is a technology of performing automating processing of experiment information of human into knowledge data and includes knowledge construction (data generation/classification), knowledge management (data application), and the like. The operation control is a technology of controlling automatic driving of a vehicle or movement of a robot and includes movement control (navigation, collision, or travelling), manipulation control (behavior control), and the like.

Meanwhile, electronic devices providing various services to a user have been recently developed. However, such electronic devices simply provide services only in specific situations or provide only services commanded by a user, and the electronic devices did not determine and provide a service desired by a user before a user command.

SUMMARY

The disclosure has been made to solve the aforementioned problem and provide an electronic device anticipatively/proactively providing a service by determining a situation before a command for a service desired by a user and a method for controlling the same.

In addition, the disclosure relates to an electronic device capable of understanding a relationship between a plurality of users and providing services suitable to the plurality of users.

There is provided a method for controlling an electronic device using an artificial intelligence neural network model to achieve the above-mentioned object, the method including determining a user mode by detecting at least one user, acquiring user information of the detected at least one user, determining a service to be provided to the detected at least one user based on the determined user mode and the user information, and providing the determined service corresponding to the user mode.

The user mode may be any one of a first user mode and a second user mode, and the first user mode may be a user mode for one detected user and the second user mode may be a user mode for a plurality of detected users.

Based on the user mode being the first user mode, the determining a service may include determining the service by inputting at least one of information of a single user, information of objects around the single user, and information of a situation around the single user, as input data, to a model trained by using the artificial intelligence neural network model.

The control method may further include, based on the user mode being the first user mode, predicting next behavior of the detected user based on at least one of information of a single user, information of objects around the single user, and information of a situation around the single user, and the determining a service includes determining the service based on the predicted next behavior of the user.

Based on the user mode being the second user mode, the determining a service may further include determining a level of closeness between the plurality of users, and determining the service based on the level of closeness.

The providing a service may further include determining a reaction of the at least one user to the service, and based on the reaction of the at least one user being positive, providing the service to the user, and based on the reaction of the at least one user being negative, determining another service to be provided to the detected at least one user by applying the information of the detected at least one user, the determined user mode, and information of the determined service to a data recognition model as input data.

The control method may further include updating a model trained with information regarding a service provided to the user as learning data.

The control method may further include, based on the electronic device being a humanoid robot, determining gaze of the robot based on gaze information of the detected at least one user.

There is provided an electronic device using an artificial intelligence neural network model to achieve the above-mentioned object, the device including an input unit, an output unit, and a processor configured to determine a user mode by detecting at least one user, acquire user information of the detected at least one user, and determine a service to be provided to the detected at least one user based on the determined user mode and the user information, in which the processor is configured to control the output unit to provide the determined service corresponding to the user mode.

The user mode may be any one of a first user mode and a second user mode, and the first user mode may be a user mode for one detected user and the second user mode may be a user mode for a plurality of detected users.

Based on the user mode being the first user mode, the processor may be configured to determine a service by inputting at least one of information of a single user, information of objects around the single user, and information of a situation around the single user, as input data, to a model trained by using the artificial intelligence neural network model.

The processor may be configured to, based on the user mode being the first user mode, predict next behavior of the detected user based on at least one of information of a single user, information of objects around the single user, and information of a situation around the single user, and determine the service based on the predicted next behavior of the user.

Based on the user mode being the second user mode, the processor may be configured to determine a level of closeness between the plurality of users, and determine the service based on the determined level of closeness.

The processor may be configured to determine a reaction of the at least one user to the service, and based on the reaction of the at least one user being positive, provide the service to the user, and based on the reaction of the at least one user being negative, determine another service to be provided to the detected at least one user by applying the information of the detected at least one user, the determined user mode, and information of the determined service to a data recognition model as input data.

The processor may be configured to update a model trained with information regarding a service provided to the user as learning data.

Based on the electronic device being a humanoid robot, the processor may be configured to determine gaze of the robot based on gaze information of the detected at least one user.

There is provided a computer-readable recording medium including a program to control an electronic device to achieve the above-mentioned object, in which a method for controlling the electronic device includes detecting at least one user and determining a user mode, acquiring user information of the detected at least one user, determining a service to be provided to the detected at least one user based on the determined user mode and the user information, and providing the determined service corresponding to the user mode.

According to the embodiments of the disclosure described above, the electronic device may detect users around the electronic device and provide various services according to the detected user.

DETAILED DESCRIPTION OF EXAMPLE EMBODIMENTS

Figure 1:
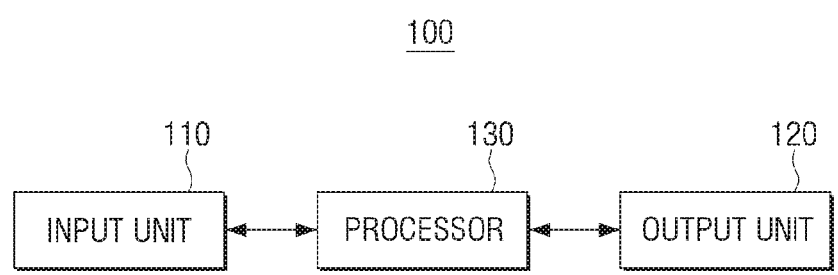
FIG. 1 is a block diagram showing a configuration of an electronic device according to an embodiment.

Hereinafter, embodiments of the disclosure will be described with reference to the accompanying drawings. It should be noted that the embodiments and the terms used herein are not for limiting the technologies disclosed in this disclosure to a specific embodiment, but they should be interpreted to include all modifications, equivalents and/or alternatives of the embodiments of the disclosure. In relation to explanation of the drawings, similar reference numerals may be used for similar elements. Unless otherwise defined specifically, a singular expression may encompass a plural expression. In this disclosure, expressions such as "A or B", "at least one of A [and/or] B,", and the like include all possible combinations of the listed items. The expressions "first," "second" and the like may denote corresponding elements, regardless of order and/or importance, and may be used to distinguish one element from another, and does not limit the elements. If it is described that a certain (e.g., first) element is "operatively or communicatively coupled with/to" or is "connected to" another (e.g., second) element, the certain element may be connected to the other element directly or through still another element (e.g., third element).

The expression "configured to" used in the disclosure may be interchangeably used with other expressions such as "suitable for," "having the capacity to," "adapted to," "made to," and "capable of," "designed to," depending on cases in terms of hardware or software. Under some circumstances, the expression "a device configured to" may mean that the device "is capable of" performing an operation together with another device or component.

For example, the phrase "a processor configured (or set) to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

An electronic device according to various embodiments of the disclosure may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a mobile medical device, a camera, or a wearable device. A wearable device may include at least one of an accessory type (e.g., a watch, a ring, a bracelet, an ankle bracelet, a necklace, a pair of glasses, a contact lens or a head-mounted-device (HMD)), a fabric or a garment-embedded type (e.g.: electronic cloth), skin-attached type (e.g., a skin pad or a tattoo), or a bio-implant type circuit.

In addition, in some embodiments, the electronic device may include at least one of, for example, a television, a digital video disk (DVD) player, an audio system, a refrigerator, air-conditioner, a vacuum cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the electronic device may include at least one of a variety of medical devices (e.g., various portable medical measurement devices (a blood glucose meter, a heart rate meter, a blood pressure meter, or a temperature measuring device), magnetic resonance angiography (MRA), magnetic resonance imaging (MRI), or computed tomography (CT) scanner, or ultrasonic wave device, etc.), a navigation system, a global navigation satellite system (GNSS), an event data recorder (EDR), a flight data recorder (FDR), an automotive infotainment device, a marine electronic equipment (e.g., marine navigation devices, gyro compasses, etc.), avionics, a security device, a car head unit, industrial or domestic robots, a drone, an ATM of financial institution, a point of sale (POS) of a store, or an Internet of Things (e.g., light bulbs, various sensors, sprinkler devices, fire alarms, thermostats, street lights, toasters, exercise equipment, hot water tanks, heater, boiler, etc.). According to another embodiment, the electronic device may include at least one of a part of furniture, building/structure, or a car, an electronic board, an electronic signature receiving device, a projector, or various measurement devices (e.g., water, electric, gas, or wave measurement devices).

In other embodiments, the electronic device may be various robots including a humanoid robot. A robot according to the embodiments of the disclosure may be, for example, a personal service robot providing services to an individual user, a public service robot for providing public service, or a robot for industries used in industrial sites. In addition, the robot according to the embodiments of the disclosure may be, for example, a general-purpose robot, a factory robot, an unmanned space exploration robot, or a medical robot. Such various robots may be a legged robot that moves with legs such as human or animals, a wheeled robot mounted with wheels or caterpillar, a flying robot, an underwater robot, and the like. Further, the robot according to the embodiments of the disclosure may be an artificial intelligence device implemented with software.

In various embodiments, the electronic device may be flexible or a combination of two or more of various devices described above. The electronic device according to an embodiment of the disclosure is not limited to the above devices.

In the disclosure, a term "user" may refer to a person using an electronic device or a device (e.g., an artificial intelligence electronic device) using an electronic device.

Hereinafter, a configuration and operations of an electronic device according to the disclosure will be described in detail.

FIG. 1 is a block diagram showing a configuration of an electronic device according to an embodiment of the disclosure.

Specifically, an electronic device 100 includes an input unit 110, an output unit 120, and a processor 130.

The input unit 110 is a component for obtaining various pieces of data around the electronic device 100. For example, the input unit 110 may obtain data regarding users or objects around the electronic device 100. For example, the input unit 110 may obtain image data regarding users or objects around the electronic device 100 and voice data around the electronic device 100. In another example, the input unit 110 may obtain various pieces of data from neighboring electronic devices. Specifically, if the electronic device 100 is a part of an IoT system, the input unit 110 may receive various pieces of data from neighboring IoT devices.

The output unit 120 is a component for outputting various services. For example, the output unit 120 may output voices, images, or texts for transmitting information. In addition, the output unit 120 may output motions for providing services. Further, the output unit 120 may output functions for providing services.

The processor 130 controls general operations of the electronic device 100. Specifically, the processor 130 may determine a service to be provided based on various pieces of data obtained via the input unit 110. That is, the processor 130 may detect a user around the electronic device 100 and determine a service desired by the detected user.

Specifically, the processor 130 may detect at least one user via the input unit 110, obtain user information of the at least one user, and determine a user mode based on the obtained user information. The user mode may be determined based on the number of detected users. For example, if the number of detected users is one, the processor 130 may determine the user mode as a first user mode. In addition, if the number of detected users is two or more, the processor 130 may determine the user mode as a second user mode. However, the detected user in this disclosure may mean all of users detected around the electronic device 100 or may also mean a user who the electronic device 100 detected to provide a service. For example, although the electronic device 100 detects five users, if the number of users who the electronic device 100 intends to provide a service is one, the electronic device may set the user mode as the first user mode.

When the user mode is the first user mode, the processor 130 may determine a service to be provided by using at least one of information of a single user, information of objects around the single user, and information of a situation around the single user. Specifically, the processor 130 may determine a service desired by the single user based on information of the single user. The service desired by the single user may be determined based on information of objects or information of situations around the user (e.g., weather, time, temperature, humidity, or economic condition).

When the user mode is the first user mode, the processor 130 may predict the next behavior of the single user by using at least one of information of the single user, the information of objects around the single user, and the information of a situation around the single user. The processor 130 may determine a service to be provided to the user based on the predicted next behavior of the user. That is, the processor 130 does not simply provide a service corresponding to the current state of the user, but may predict the next behavior of the user and determine and provide a service necessary for the user with respect to the predicted behavior.

If the user mode is the second user mode, the processor 130 may determine a level of closeness between the plurality of detected users, and determine a service to be provided to the plurality of users based on the determined level of closeness. Specifically, the processor 130 may determine the level of closeness between users by analyzing facial expressions of the plurality of users. In addition, the processor 130 may determine the level of closeness between users by analyzing gaze between the plurality of users. Further, the processor 130 may determine the level of closeness between users based on past information of the plurality of users. For example, if there is past data of at least one of the plurality of users, the processor 130 may determine the level of closeness between users by using the past data of the at least one user.

The processor 130 may control the output unit 120 to provide the determined service. The processor 130 may determine a reaction of the at least one user to the provided service and provide a new service according to the reaction of the user. Specifically, if the reaction of the user to the provided service is positive, the processor 130 may continue providing the service. Alternatively, if the reaction of the user to the provided service is negative, the processor 130 may stop providing the service and determine and provide a new service. Specifically, the processor 130 may determine a new service based on the information of the at least one detected user, the determined user mode, and the information of the service to which the user has negatively reacted.

The processor 130 may determine a service to be provided to the user based on the information of the at least one user and the determined user mode. Specifically, the processor 130 may input the user information and the user mode to a model trained with an artificial intelligence algorithm as input data in order to determine the service. The artificial intelligence algorithm and the trained model will be described later.

When determining a service to be provided to at least one user, the processor 130 may control the output unit 120 to provide a service.

Figure 2:
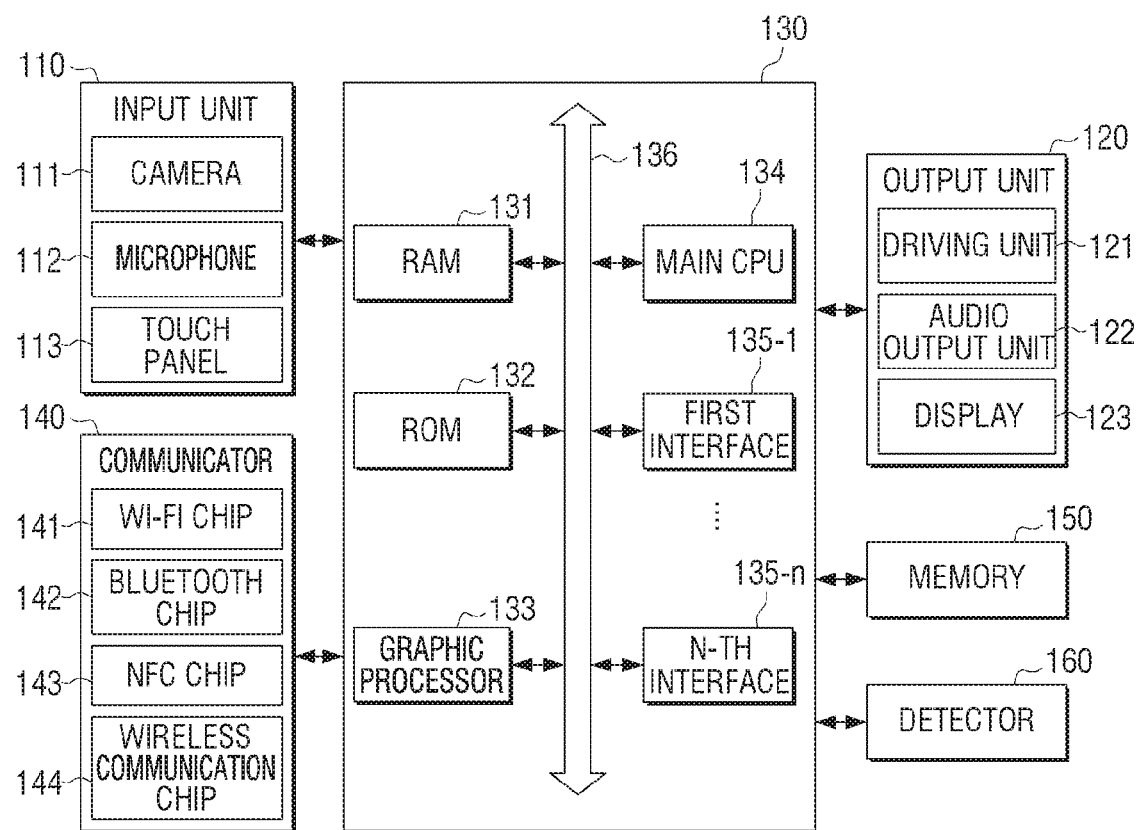
FIG. 2 is a block diagram specifically showing a configuration of the electronic device according to an embodiment.

FIG. 2 is a block diagram specifically showing a configuration of the electronic device according to an embodiment of the disclosure.

Specifically, the electronic device 100 may further include a communicator 140, a memory 150, and a detector 160, in addition to the input unit 110, the output unit 120, and the processor 130.

The input unit 110 may include a camera 111, a microphone 112, a touch panel 113, and the like to obtain various external inputs.

The camera 111 is a component for obtaining image data around the electronic device 100. The camera 111 may capture still images or videos. For example, the camera 111 may include one or more image sensors (e.g., front sensor or rear sensor) a lens, an image signal processor (ISP), or a flash (e.g., an LLED or a xenon lamp). The camera 111 may be activated only when specific conditions are satisfied, in order to prevent unnecessary power consumption. For example, the camera 111 may be activated only when users around the electronic device 100 are detected. The microphone 112 is a component for obtaining sounds around the electronic device 100. The microphone 112 may generate electronic voice information by receiving an external audio signal. The microphone 112 may use various noise removal algorithms for removing noise generated during a process of receiving the external audio signal. In the same manner as in the case of the camera 111, the microphone 112 may be activated only when specific conditions are satisfied in order to prevent unnecessary power consumption. That is, the microphone 112 may be activated only when users are detected around the electronic device 100. In addition, if the electronic device 100 is a part of the IoT system, the microphone 112 may be activated when conditions are satisfied such as a front door is opened, room light is turned on, and the like.

The touch panel 113 is a component for receiving various user inputs. The touch panel 113 may receive data by user manipulation. The touch panel may also be activated only under the same conditions as described above in order to prevent unnecessary power consumption. In addition, the touch panel 113 may be activated only when a touch of a user is detected. The touch panel 113 may be configured in combination with a display which will be described later.

The input unit 110 may be various components for receiving various pieces of data, in addition to the camera 111, the microphone 112, and the touch panel 113 described above.

The output unit 112 may be constituted with a driving unit 121, an audio output unit 122, and a display 123.

The driving unit 121 is a component for outputting various motions regarding the input data. If the electronic device 100 according to an embodiment of the disclosure is a humanoid robot, the driving unit 121 may include at least one joint corresponding to the joint of human.

The audio output unit 122 is a component for outputting various sounds regarding the input data. The audio output unit 122 may output not only various pieces of audio data obtained by executing various processing such as decoding, amplification, or noise filtering by an audio processor (not shown), but also various alerts or voice messages. Particularly, the audio output unit 122 may be implemented as a speaker, but this is merely an embodiment, and the audio output unit 122 may be implemented as an output terminal capable of outputting audio data.

The display 123 is a component for outputting various images of the input data. In an embodiment, the display 123 may output an avatar image for expressing emotions. The display 123 for providing various images may be implemented as a display panel in various forms. For example, the display panel may be implemented with various display technologies such as a liquid crystal display (LCD), organic light emitting diodes (OLED), active-matrix organic light-emitting diode (AM-OLED), liquid crystal on silicon (LcoS), or digital light processing (DLP). In addition, the display 123 may be combined with at least one of a front surface region, a side surface region, and a rear surface region of the electronic device 100 in a form of a flexible display.

The communicator 140 may execute communication with an external device. Particularly, the communicator 140 may include various communication chips for executing wireless communication such as a Wi-Fi chip 141, a Bluetooth chip 142, NFC chip 143, and an a wireless communication chip 144. Each of the Wi-Fi chip 141, the Bluetooth chip 142, and the NFC chip 143 performs communication by a LAN system, a Wi-Fi system, a Bluetooth system, and an NFC system. When using the Wi-Fi chip 141 or the Bluetooth chip 142, various pieces of connection information such as SSID or session key may be transmitted or received first to allow the communication connection by using these, and then various pieces of information may be transmitted and received. The wireless communication chip 144 means a chip executing the communication based on various communication standards such as IEEE, Zigbee, 3rd Generation (3G), 3rd Generation Partnership Project (3GPP), and Long Term Evolution (LTE).

The communicator 140 may also be operated by a wired communication system including at least one of a universal serial bus (USB), a high definition multimedia interface (HDMI), recommended standard 232 (RS-232), power line communication, or plain old telephone service (POTS). In particular, the communicator may transmit or receive various pieces of data of users around the electronic device 100 by executing the communication with external devices.

The memory 150 may store, for example, instructions or data related to at least another component of the electronic device 100. According to an embodiment, the memory 150 may store software and/or a program. The program may include, for example, a kernel, middleware, an application programming interface (API), and/or an application program (or "application"). At least some of the kernel, the middleware, or the API may be referred to as an operating system. The kernel may, for example, control or manage system resources used to execute operations or functions realized in other programs. In addition, the kernel may provide an interface for controlling or managing system resources by accessing individual components of the electronic device 100 in the middleware, the API, or the application program.

The middleware may act as an intermediary so that the API or the application program may communicate with the kernel to transmit and receive data. In addition, the middleware may process one or more work requests received from the application program according to an order of priority. For example, the middleware may apply the order of priority to use a system resource of the electronic device 100 to at least one of the application programs and process the one or more work requests. The API is an interface for controlling functions provided by the kernel or the middleware, and may include, for example, at least one interface or function (e.g., instruction) for file control, window control, image processing, or character control.

In addition, the memory 150 may include at least one of an embedded memory or an external memory. The embedded memory may include, for example, at least one of a volatile memory (e.g., DRAM, SRAM, or SDRAM) and a non-volatile memory (e.g., one time programmable ROM (OTPROM), PROM, EPROM, EEPROM, mask ROM, flash ROM, flash memory, hard drive, or solid state drive (SSD)). The external memory may include a flash drive, for example, a compact flash (CF), secure digital (SD), a micro-SD, a mini-SD, extreme digital (xD), a multi-media card (MMC), or a memory stick. The external memory may be functionally or physical connected to the electronic device 100 via various interfaces.

The memory 150 may store user data. For example, the memory 150 may store past data of a specific user using the electronic device 100.

The detector 160 is a component for obtaining surrounding information. As described above, the detector 160 may be constituted with various sensors and may obtain user data by analyzing information detected by the sensors. The detector 160 may include various sensors such as an infrared sensor, a pressure sensor, an illuminance sensor, a humidity sensor, and a gyro sensor. For example, if the detector 160 includes an infrared sensor, the detector 160 may obtain data regarding presence or absence of a user or obtain data regarding a temperature of a user or the like by using the infrared sensor. In addition, if the detector 160 includes a pressure sensor, the detector 160 may obtain data regarding a physical contact with a user. Further, if the detector 160 includes an illuminance sensor, a humidity sensor, or the like, the detector 160 may obtain information indicating humidity or illuminance regarding a user as the user data.

The processor 130 may control general operations of the electronic device 100 by using various programs stored in the memory 150.

The processor 130 may be constituted with a RAM 131, a ROM 132, a graphic processor 133, a main CPU 134, first to n-th interfaces 135-1 to 135-n, and a bus 136. The RAM 131, the ROM 132, the graphic processor 133, the main CPU 134, and the first to n-th interfaces 135-1 to 135-n may be connected to each other via the bus 136.

The RAM 131 stores the O/S and application programs. Specifically, when the electronic device 100 is booted up, the O/S is stored in the RAM 131 and various pieces of application data selected by a user may be stored in the RAM 131.

The ROM 132 may store a set of instructions for system booting. A turn-on instruction is input to supply power, the main CPU 134 copies the O/S stored in the memory 150 to the RAM 131 according to the instruction stored in the ROM 132 and boots the system up by executing the O/S. If the booting is completed, the main CPU 134 copies various application programs stored in the memory 150 to the RAM 131 and execute various operations by executing the application programs copied to the RAM 131.

The graphic processor 133 generates a screen including various objects such as items, images, texts, and the like by using an operating unit (not shown) and a rendering unit (not shown). The operating unit may be a component that calculates attribute values such as a coordinate value of each object to be displayed, a shape, a size, a color and the like thereof according to the layout of the screen by using the control command received from the input unit 110. The rendering unit may be a component that generates screens having various layouts including objects based on the attribute values calculated by the operating unit. The screen generated by the rendering unit may be displayed in a display region of the display 130.

The main CPU 134 may execute the booting by using the O/S stored in the memory 150 by accessing the memory 150. The main CPU 134 may execute various operations by using various programs, contents, data, and the like stored in the memory 150.

The first to n-th interfaces 135-1 to 135-n may be connected to various components described above. One of the first to n-th interfaces 135-1 to 135-n may be a network interface connected to an external device via a network.

Hereinafter, various embodiments according to the disclosure will be described in detail with reference to FIGS. 3 to 7.

Figure 3:
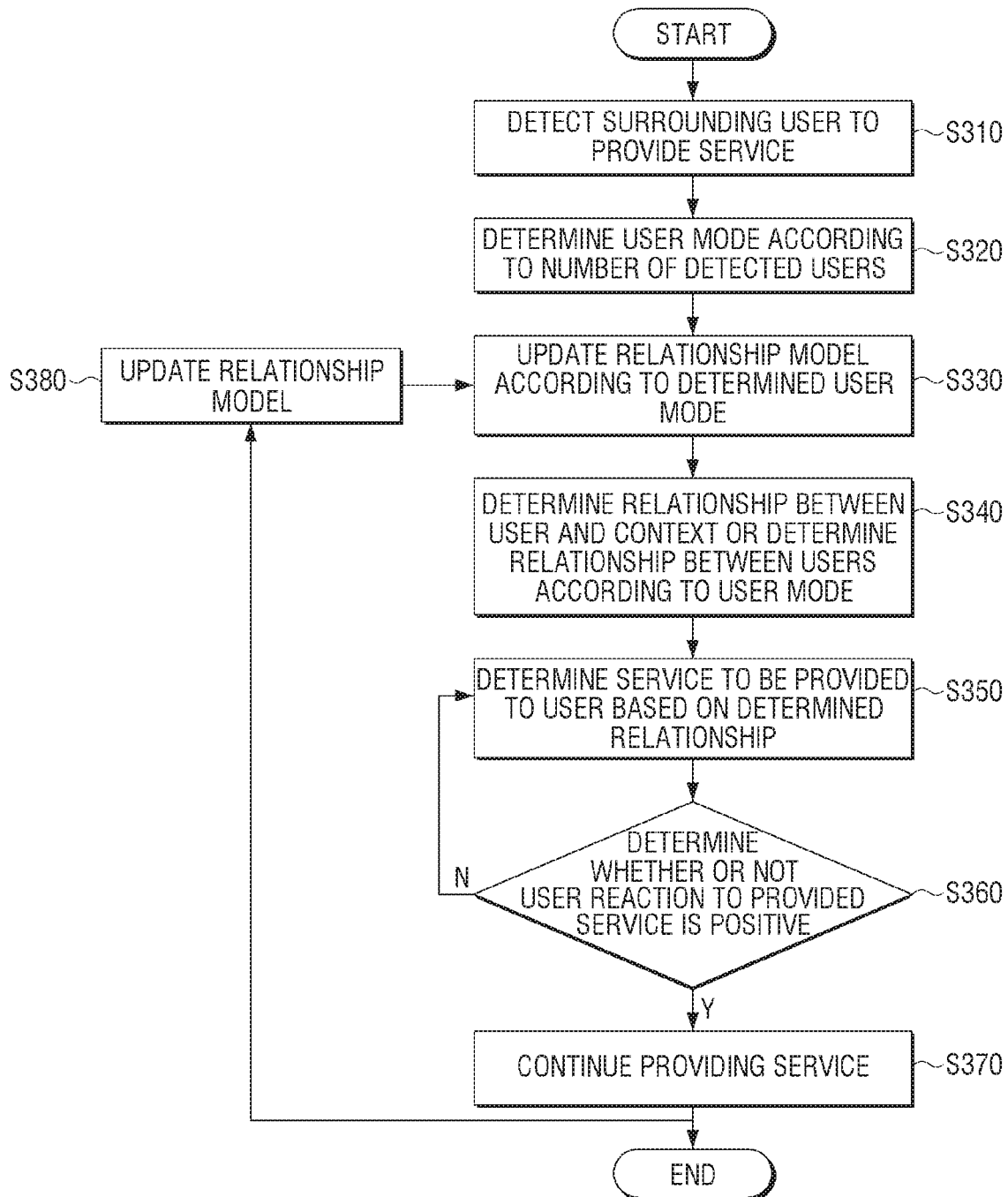
FIG. 3 is a flowchart for explaining a method for providing a service of the electronic device according to an embodiment.

FIG. 3 is a flowchart for explaining a method for providing a service of the electronic device according to an embodiment of the disclosure.

The electronic device 100 may detect a user around the electronic device 100 to provide a service (S310). The electronic device 100 may determine a user mode according to the number of detected users (S320). Specifically, if the number of the detected users is one, the electronic device 100 may determine the user mode as the first user mode, and if the number of the detected users is two or more, the electronic device 100 may determine the user mode as the second user mode. The operations of the electronic device 100 in the first user mode will be described later with reference to FIGS. 4 and 5, and the operations of the electronic device 100 in the second user mode will be described later with reference to FIGS. 6 and 7.

The electronic device 100 may update a relationship model according to the determined user mode (S330). Specifically, the electronic device 100 may update a user-context model in the first user mode and the electronic device 100 may update a user-user model in the second user mode.

Hereinafter, the electronic device 100 may determine a relationship between a user and a context or determine a relationship between users according to the user mode (S340). The electronic device 100 may determine a service to be provided to a user based on the relationship determined in Step S340 (S350).

The electronic device 100 may provide the determined service and determine a user reaction. Specifically, the electronic device 100 may determine whether or not the user reaction to the provided service is positive (S360). If the user reaction is positive (S360—Y), the electronic device 100 may continue providing the service (S370). If the user reaction is negative (S360—N), the electronic device 100 may return to Step S350 and determine a service to be provided to the user again.

When the service is provided to the user, the electronic device 100 may update the relationship model (S380). That is, the electronic device 100 may input information related to the reaction of the user to the provided service and update the relationship model.

Figure 4:
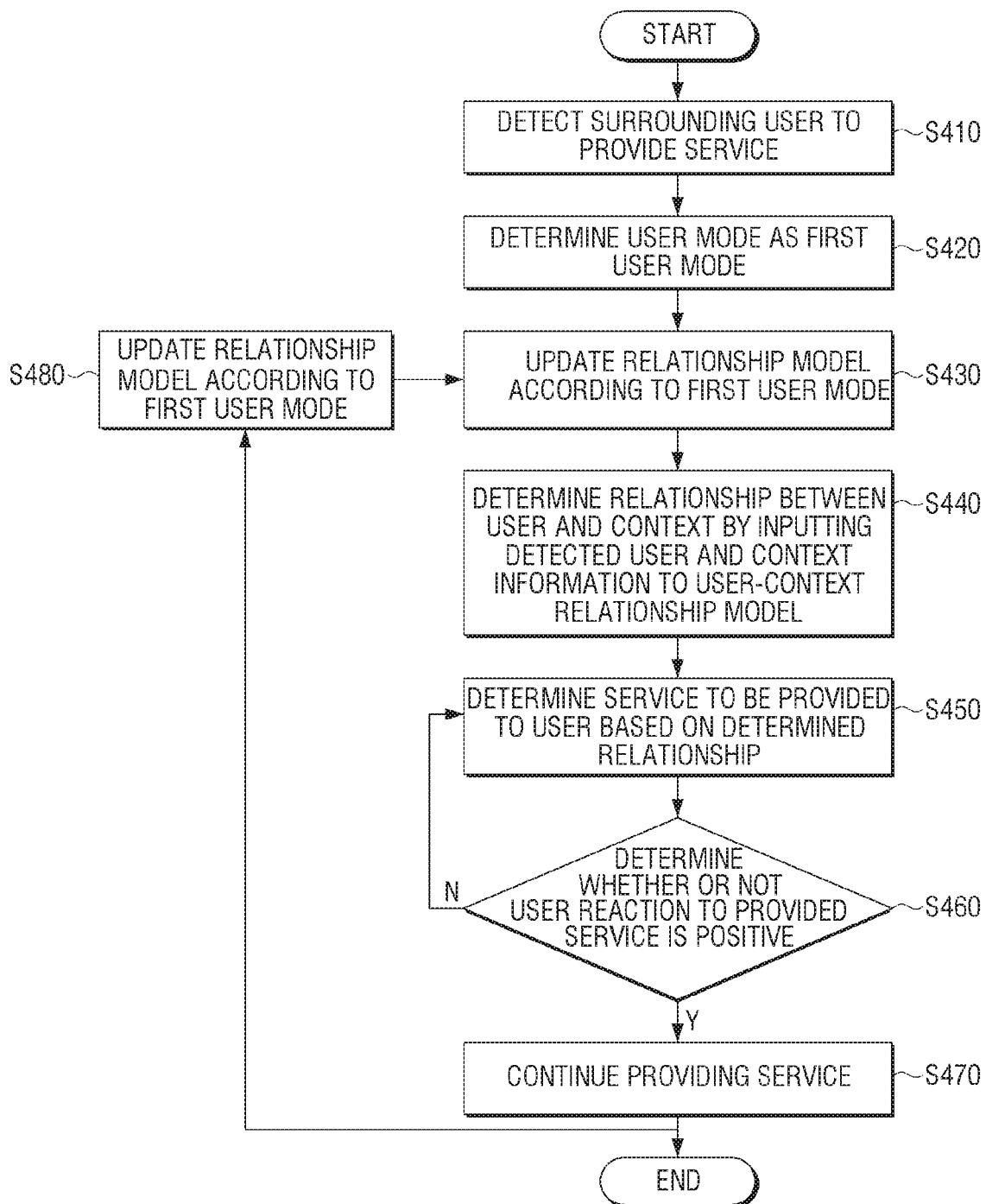
FIG. 4 is a flowchart for explaining operations of the electronic device in a first user mode according to an embodiment.

FIG. 4 is a flowchart for explaining operations of the electronic device in a first user mode according to an embodiment of the disclosure.

The electronic device 100 may detect a user around the electronic device 100 to provide a service (S410). The electronic device 100 may determine the user mode as the first user mode, because the number of detected users is one (S420).

The electronic device 100 may update a relationship model according to the first user mode (S430). That is, the electronic device 100 may update a user-context relationship model in the first user mode, as described above. Specifically, the user-context relationship model is a relationship model for understanding a relationship between a single user and a context. The context herein may be various pieces of information such as an object, a location, time, weather, a temperature, humidity, economic conditions, social issues, and the like. The user-context relationship model may be constructed based on a database of a user and the context, constructed based on graph/ontology, or constructed based on deep learning/Bayesian prediction.

When the user-context relationship model is updated, the electronic device 100 may input the detected user and context information to the user-context relationship model and determine the relationship between the user and the context (S440). The electronic device 100 may determine a service to be provided to the user based on the relationship determined in Step S440 (S450).

The electronic device 100 may provide the determined service and determine a user reaction. Specifically, the electronic device 100 may determine whether or not the user reaction to the provided service is positive (S460). If the user reaction is positive (S460—Y), the electronic device 100 may continue providing the service (S470). If the user reaction is negative (S460—N), the electronic device 100 may return to Step S350 and determine a service to be provided to the user again.

When the service is provided to the user, the electronic device 100 may update the user-context relationship model (S480). That is, the electronic device 100 may input information related to the reaction of the user to the provided service and update the user-context relationship model.

Figure 5:
FIG. 5 is an exemplary diagram for explaining the method for providing the service of the electronic device in the first user mode according to an embodiment.
Figure 5:
Figure 5:
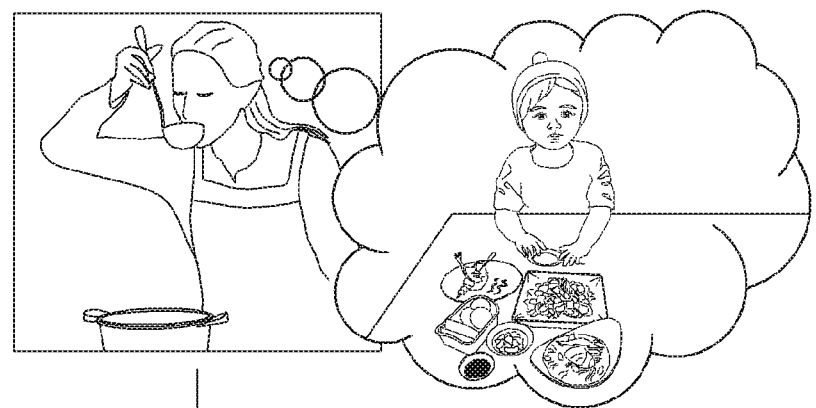
Figure 5:
Figure 5:
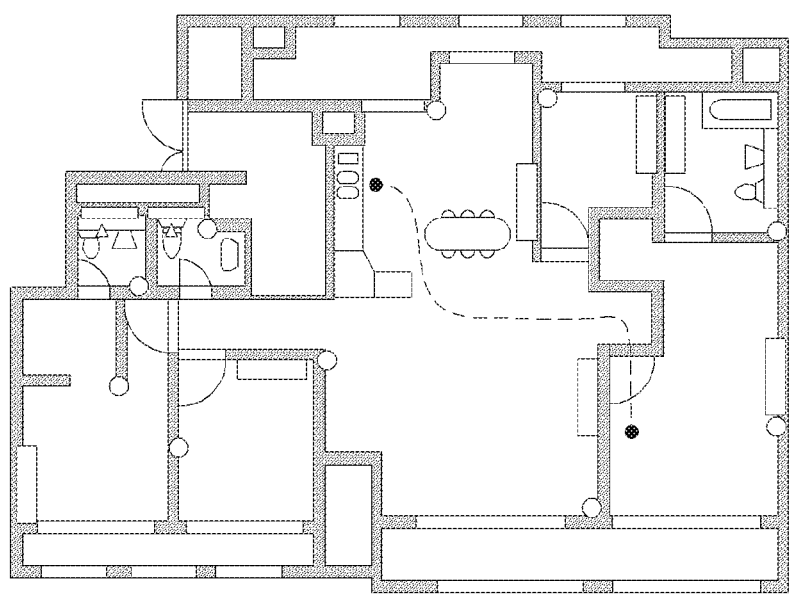

FIG. 5 is an exemplary diagram for explaining the method for providing the service of the electronic device in the first user mode according to an embodiment of the disclosure.

Referring to FIG. 5, the electronic device 100 may detect a single user (hereinafter, mother). The electronic device 100 may determine that the mother is currently cooking by inputting data to the user-context model. Specifically, the data input to the user-context model may be the detected user (mother) and context data. The context data herein may be a place (kitchen) where mother is positioned, objects used by mother (cooker such as a ladle or a pot), current time information, and the like.

The electronic device 100 may analyze past data of the detected mother, and determine that mother will call another user (kid) for a meal after finishing the cooking with a high possibility.

The electronic device 100, which predicted the next behavior of mother, may determine a service of providing a state of the kid to the mother or a service of calling the kid when the meal is ready as the service to be provided, and may provide the determined service. That is, as shown on the lower side of FIG. 7, when the electronic device 100 is a robot, the robot may move to a kid's room to look the state of the kid or may output a voice to call the kid for a meal.

In another embodiment, if a father comes to a living room, the electronic device 100 may determine the father as a user to provide the service. The electronic device 100 may input data to the user-context model and determine a state of the father and a necessary service. Specifically, the data input to the user-context model may be the detected user (father) and context data. The context data may be a place where father is positioned (bedroom to living room), current time information (morning), and the like. The electronic device 100 may determine that father gets water from a refrigerator and drinks it with a high possibility, when the father comes out from the bedroom to the living room in the morning. The electronic device 100 may grasp where water is around the electronic device 100 and inform the father the place where the water is or provide water.

The electronic device 100 according to the embodiment described above may be a robot. That is, the robot may move to grasp the surrounding context information and the user information and provide the service. Specifically, if the electronic device 100 is a robot, the robot may mainly observe the user and may observe preferred objects around the user. At that time, the robot may observe the preferred objects for a short period of time and observe the user again, thereby continuously grasp the state of the user. When the robot is in a house, the robot may not need to construct relationship data between the user and every objects and places in the house. That is, the robot may not construct a relationship of a user with respect to only an object in a changeable state (for example, a TV, a window, a dynamic object such as a pet, and the like, instead of a fixed object such as wall or table in the house). If the electronic device 100 is a robot, the robot may use eye gaze in various ways. For example, in a case of the interaction between the robot and the user, the robot may look at the user. However, if another object is detected while the robot was looking at the user in the interaction between the robot and the user, the eye of the robot may move to the other object and then the robot may look at the user again. With such a method, a robot that is more looks like human may be realized.

However, there is no limitation thereto, and the electronic device 100 may be constituted with a home network system. That is, the home network system may collect various pieces of information in the house, detect a user who needs a service, and provide a service.

Figure 6:
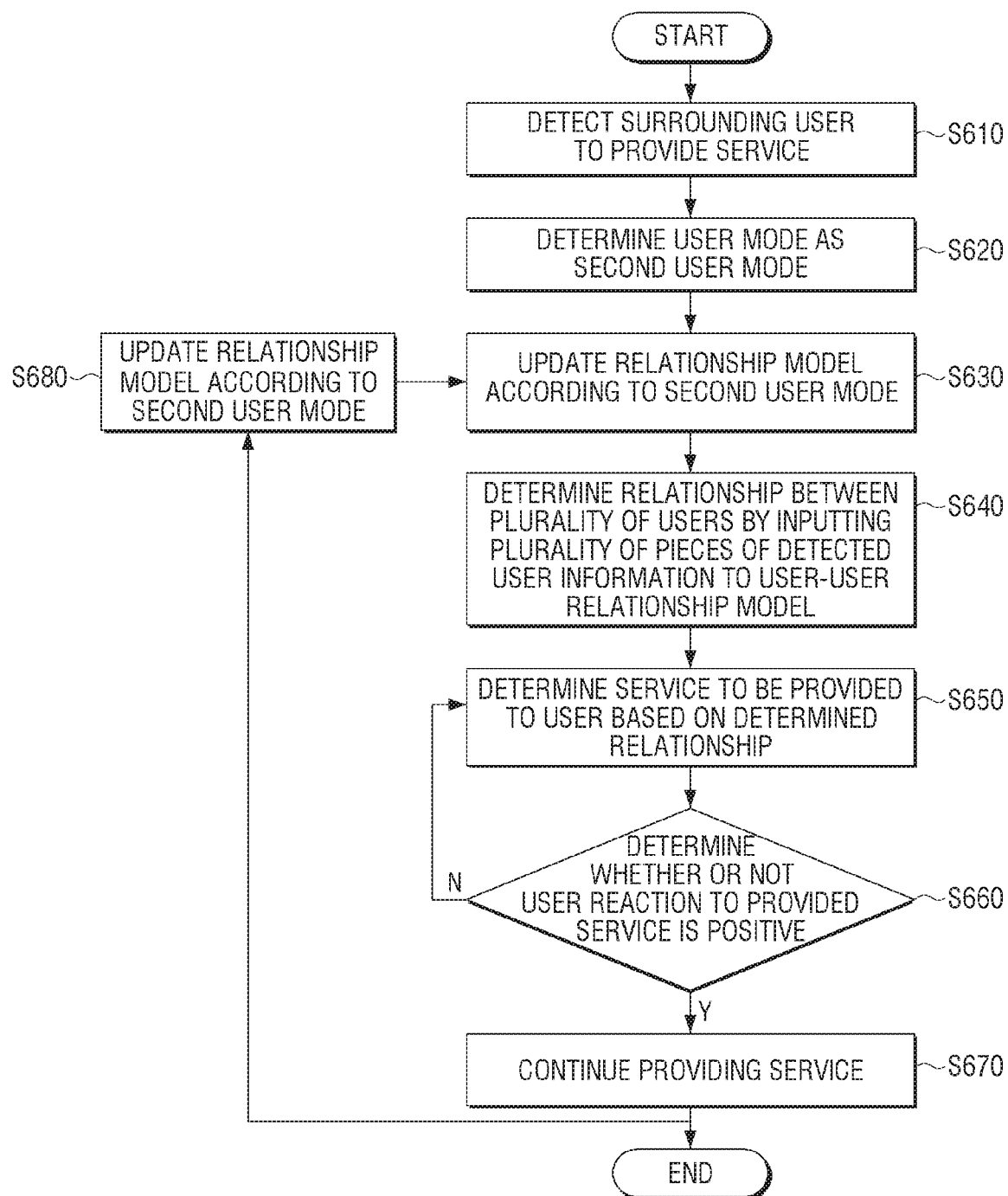
FIG. 6 is a flowchart for explaining operations of the electronic device 100 in a second user mode according to an embodiment.

FIG. 6 is a flowchart for explaining operations of the electronic device 100 in the second user mode according to an embodiment of the disclosure.

The electronic device 100 may detect a plurality of users to provide a service (S610). The electronic device 100 may determine the user mode as the second user mode, because the number of detected users is two or more (S620).

The electronic device 100 may update a relationship model according to the second user mode (S630). That is, the electronic device 100 may update a user-user relationship model in the second user mode, as described above. Specifically, the user-user relationship model may be implemented by extending the user-context relationship model. That is, the user-user relationship model is a relationship model for determining a relationship between users by including the user-context relationship model for each user. The user-user relationship model may be constructed based on a database of a plurality of users, constructed based on graph/ontology, or constructed based on deep learning/Bayesian prediction.

When the user-user relationship model is updated, the electronic device 100 may input a plurality of pieces of the detected user information to the user-user relationship model and determine the relationship the plurality of users (S640). The electronic device 100 may determine the relationship between the plurality of users based on past data and current data. The past data is data related to a histogram showing the number of times of dialogues between the plurality of users. In addition, the past data may be data related to the number of times the user has uttered names of other users with positive words. Further, the past data may be data related to a social media relationship between the plurality of users. The current data may be data obtained by analyzing facial expressions of the plurality of users. In addition, the current data may be data regarding gaze recognition between the plurality of users. The data regarding gaze recognition may be, for example, data related to the number of times of gaze between the plurality of users.

The electronic device 100 may determine a service to be provided to the plurality of users based on the relationship determined in Step S640 (S650).

The electronic device 100 may provide the determined service and determine a user reaction. Specifically, the electronic device 100 may determine whether or not the user reaction to the provided service is positive (S660). If the user reaction is positive (S660—Y), the electronic device 100 may continue providing the service (S670). If the user reaction is negative (S660—N), the electronic device 100 may return to Step S650 and determine a service to be provided to the user again.

When the service is provided to the user, the electronic device 100 may update the user-user relationship model (S680). That is, the electronic device 100 may input information related to the reaction of the user to the provided service and update the user-user relationship model.

Figure 7:
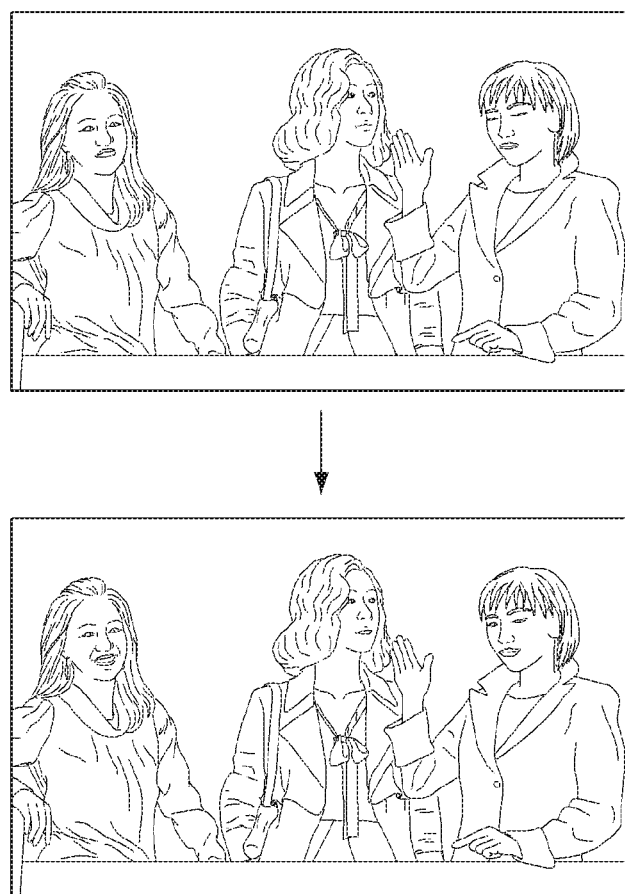
FIG. 7 is an exemplary diagram for explaining the method for providing the service of the electronic device in the second user mode according to an embodiment.

FIG. 7 is an exemplary diagram for explaining the method for providing the service of the electronic device in the second user mode according to an embodiment of the disclosure.

Referring to FIG. 7, the electronic device 100 may detect a plurality of users in a car. The electronic device 100 may determine a level of closeness between the plurality of detected users. Specifically, the electronic device 100 may analyze emotional states of the plurality of users through face recognition with respect to the plurality of users and determine the level of closeness between the plurality of users through the analyzed emotional states of the users. In addition, the electronic device 100 may analyze the gaze between the plurality of users and analyze the level of closeness between the plurality of users. Further, if there is past data of at least one user among the plurality of users, the electronic device 100 may analyze the level of closeness between the plurality of users based on the past data of the at least one user.

The electronic device 100 may determine a service to be provided based on the determined level of closeness. For example, if it is not determined that the plurality of users are not close to each other, the electronic device 100 may provide information regarding a subject or humor that the plurality of users may be interested in, or may reproduce music or contents that the plurality of users may be interested in. If there is the past data of the plurality of users, the electronic device 100 may determine information regarding a subject, music, contents, and the like that each of users may be interested in, and may provide a service that all of the plurality of users are interested in.

In another embodiment, the electronic device 100 may determine a change in the level of closeness between the plurality of users and provide a service according to a change in level of closeness between the plurality of users. For example, if the plurality of users are mother and a kid, the electronic device 100 may determine a change in level of closeness between mother and kid. The electronic device 100 may determine an average level of closeness between mother and kid, and may provide a suitable service, when the level of closeness decreases or increases with respect to the average level of closeness. For example, when mother scolds kid and the level of closeness between mother and kid is decreased, the electronic device 100 may determine that the level of closeness between mother and kid is decreased with respect to the average level of closeness. At that time, the electronic device 100 may provide a service to increase the level of closeness between mother and kid. For example, the electronic device 100 may provide a child discipline related content to mother or kid.

In still another embodiment, the electronic device 100 may provide a suitable service by using past relationship data between the plurality of users. For example, if the detected users are mother and kid and current state is a meal time, the electronic device 100 may provide a recipe for kid from the fact that mother cooked and had dinner with the kid in the meal time in the past. However, if the detected users are father and mother and the current state is a meal time, the electronic device 100 may provide information regarding food delivery from the fact that father did not cook mostly in the past.

Hereinafter, a method for generating a data recognition model using a learning algorithm and providing a service to a user through the data recognition model according to an embodiment of the disclosure will be described with reference to FIGS. 8 to 11.

Figure 8:
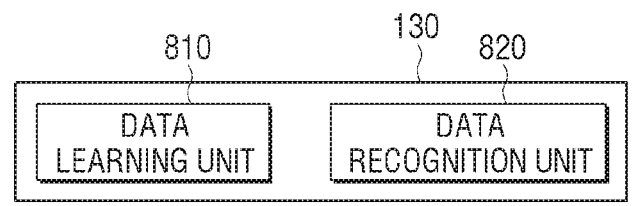
FIGS. 8, 9, 10, and 11 are exemplary views for explaining a method for generating a data recognition model using a learning algorithm, performing clustering with respect to user data using the data recognition model, and determining a motion of a robot with respect to the user data according to an embodiment.

Referring to FIG. 8, the processor 130 according to an embodiment may include a data learning unit 810 and a data recognition unit 820.

The data learning unit 810 may train a data recognition model to have criteria to determine the state of the single user or the relationship between the plurality of users. In addition, the data learning unit 810 may train the data recognition model to have criteria for determining the operation of the electronic device 100 with respect to the user data. The data learning unit 810 may generate the data recognition model having determination criteria by applying learning data to the data recognition model for determining a service to be provided to a user or determining the operation of the electronic device 100 with respect to the user data.

In an embodiment, the data learning unit 810 may generate or train the data recognition model by using user information and context information as the learning data. The user information may be image information, voice information, motion information, and the like of the user and the context information may be various pieces of information, such as an object, position, time, weather, temperature, humidity, economic conditions, social issues and the like.

In another embodiment, the data learning unit 810 may generate or train the data recognition model by using information of the plurality of users as the learning data. The information of the plurality of users may be image information, voice information, motion information, information of level of closeness, gaze information, and the like of the user with respect to the plurality of users.

The data recognition unit 820 may determine the situation based on recognition data. The data recognition unit 820 may determine the situation from predetermined recognition data by using the trained data recognition model. The data recognition unit 820 may obtain predetermined recognition data according to predetermined criteria and apply the obtained recognition data to the data recognition model as an input value, thereby determining (or estimating) a predetermined situation based on the predetermined recognition data.

In addition, a result value output by applying the obtained recognition data to the data recognition model as the input value may be used to update the data recognition model.

In particular, according to an embodiment of the disclosure, the data recognition unit 820 may apply recognition data regarding voice information and recognition data regarding image information to the data recognition model as input values, thereby obtaining a determination result obtained by determining the situation of the electronic device 100 (current situation of a user, estimation of next behavior of the user, or service to be provided to the user).

At least a part of the data learning unit 810 and at least a part of the data recognition unit 820 may be implemented as a software module or may be produced in a form of at least one hardware chip and mounted on the electronic device. For example, at least one of the data learning unit 810 and the data recognition unit 820 may be produced in a form of a dedicated hardware chip for artificial intelligence (AI) or may be produced as a part of a general-purpose processor (e.g., CPU or application processor) or a graphic dedicated processor (e.g., GPU) and mounted on various electronic devices described above. The dedicated hardware chip for artificial intelligence may be a dedicated processor specialized in possibility calculation, and may rapidly process a calculation process in the artificial intelligence field such as machine training with higher parallel processing performance than that of the conventional general-purpose processor. If the data learning unit 810 and the data recognition unit 820 are implemented as software modules (or program module including an instruction), the software modules may be stored in non-transitory computer readable media which are readable by a computer. In such a case, the software modules may be provided by an operating system (O/S) or provided by a predetermined application. In addition, a part of the software modules may be provided by the operating system (O/S) and the other part thereof may be provided by the predetermined application.

In such a case, the data learning unit 810 and the data recognition unit 820 may be mounted on one electronic device 100 (or electronic device) or may be mounted on separate electronic devices 100 (or electronic device), respectively. For example, one of the data learning unit 810 and the data recognition unit 820 may be included in one electronic device 100 and the other one thereof may be included in one external server. In addition, regarding the data learning unit 810 and the data recognition unit 820, model information constructed by the data learning unit 810 may be provided to the data recognition unit 820 and data input to the data recognition unit 820 may be provided to the data learning unit 810 as additional learning data in a wired or wireless manner.

Figure 9:
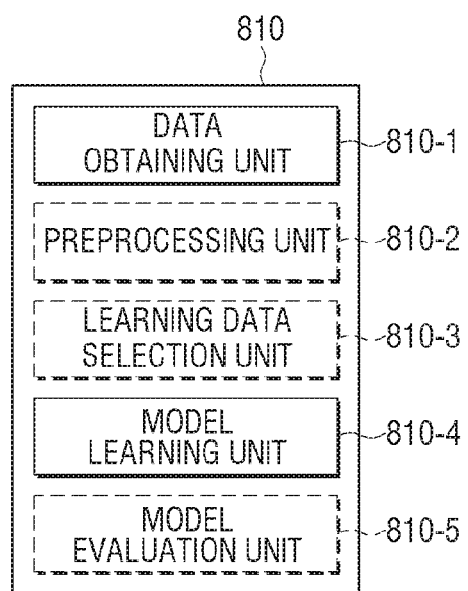

FIG. 9 is a block diagram of the data learning unit 810 according to an embodiment of the disclosure.

Referring to FIG. 9, the data learning unit 810 according to an embodiment may include a data obtaining unit 810-1 and a model learning unit 810-4. In addition, the data learning unit 810 may further optionally include at least one of a preprocessing unit 810-2, a learning data selection unit 810-3, and a model evaluation unit 810-5.

The data obtaining unit 810-1 may obtain learning data for determining a situation of a single user or a relationship between a plurality of users.

For the learning data, data collected or tested by the data learning unit 810 or by a manufacturer of the electronic device 100 may be used. In addition, the learning data may include voice data generated in a natural language uttered by a user via the microphone according to the disclosure. In addition, the learning data may include movement data of a user captured with the camera.

The data learning unit 810 may further include the preprocessing unit 810-2 and the learning data selection unit 810-3 in order to improve a recognition result of the data recognition model or save resources or time necessary for generating the data recognition model.

The preprocessing unit 810-2 may preprocess the data obtained by the data obtaining unit 810-1.

For example, the preprocessing unit 810-2 may process the obtained data in a predetermined format so that the model learning unit 810-4 easily uses the data for training of the data recognition model. For example, the preprocessing unit 810-2 may process voice data obtained by the data obtaining unit 810-1 to text data and may process image data to image data in a predetermined format. The preprocessed data may be provided to the model training unit 810-4 which will be described later as the learning data.

In addition, the learning data selection unit 810-3 may select the learning data necessary for training from the preprocessed data. The selected learning data may be provided to the model learning unit 810-4. The learning data selection unit 810-3 may select learning data necessary for training from the preprocessed data according to predetermined selection criteria. In addition, the learning data selection unit 810-3 may select learning data necessary for training according to the predetermined selection criteria by the training of the model training unit 810-4. In an embodiment of the disclosure, the learning data selection unit 810-3 may select only voice data uttered by a specific user from input voice data and may select only an area including a person except the background from image data.

The model learning unit 810-4 may train the data recognition model used for determining the situation of the single user or the relationship between the plurality of users by using the learning data. For example, the model training unit 810-4 may train the data recognition model through supervised learning using at least some of learning data as determination criteria. In addition, the model learning unit 810-4 may train the data recognition model, for example, through unsupervised learning of finding out determination criteria for determining the situation by self-training using the learning data without particular supervision.

In addition, the model learning unit 810-4 may train selection criteria for determining which learning data is to be used for determining the situation of the single user or the relationship between the plurality of users.

The data recognition model may be constructed by considering the application field of the recognition model, the object of the training, computer performance of the device, and the like. The data recognition model may be, for example, a model based on the neural network. The data recognition model may be designed to simulate a brain structure of human on the computer. The data recognition model may include a plurality of network nodes including weights and simulating neurons of the neural network of human. The plurality of network nodes may form connections to each other to simulate a synaptic activity in that the neurons transmit and receive signals through synapse. The data recognition model may include, for example, a neural network model or a deep learning model developed from the neural network model. In a deep learning model, a plurality of network nodes may be positioned at depths (or on layers) different from each other and may transmit and receive data according to the convolution connection. For example, a deep neural network (DNN), a recurrent neural network (RNN), and a bidirectional recurrent deep neural network (BRDNN) may be used as the data recognition model, but there is no limitation thereto.

According to the embodiments, if the number of data recognition models constructed in advance is more than one, the model learning unit 810-4 may determine a data recognition model with a basic learning data that is highly relevant to the input learning data, as a data recognition model to be trained. In such a case, the basic learning data pieces may be classified in advance for each type of data and the data recognition models may be constructed in advance for each type of data. For example, the basic learning data pieces may be classified in advance based on various criteria such as a region where the learning data is generated, time when the learning data is generated, a size of the learning data, a genre of the learning data, a creator of the learning data, a type of an object in the learning data, and the like.

In addition, the model learning unit 810-4 may train the data recognition model, for example, by using a learning algorithm including error back-propagation or gradient descent.

In addition, the model learning unit 810-4 may, for example, train the data recognition model through supervised learning using the determination criteria as input values. Further, the model learning unit 810-4 may train the data recognition model, for example, through unsupervised learning of finding out the situation of the single user or the relationship between the plurality of users by self-training using necessary learning data without particular supervision. Furthermore, the model learning unit 810-4 may train the data recognition model, for example, through reinforcement learning using a feedback regarding whether or not a result of the determination of the situation of the single user or the relationship between the plurality of users by the training is accurate.

In addition, when the data recognition model is trained, the model learning unit 810-4 may store the trained data recognition model. In such a case, the model learning unit 810-4 may store the trained data recognition model in the memory 150 of the electronic device 100. In addition, the model learning unit 810-4 may store the trained data recognition model in a memory of a server connected to the electronic device 100 in a wired manner or via a wireless network.

The data learning unit 810 may further include the model evaluation unit 810-5 in order to improve a recognition result of the data recognition model.

The model evaluation unit 810-5 may input evaluation data to the data recognition model, and causes the model learning unit 810-4 to perform the training again, if a recognition result output from the evaluation data does not satisfy a predetermined criterion. In this case, the evaluation data may be data predefined for evaluating data recognition models.

For example, if a number or a rate of the evaluation data pieces having inaccurate recognition results, among recognition results of the trained data recognition model regarding the evaluation data, exceeds a predetermined threshold value, the model evaluation unit 810-5 may evaluate that the predetermined criterion is not satisfied. For example, if the predetermined criterion is defined as a rate of 2% and the trained data recognition model outputs inaccurate recognition results with respect to more than 20 pieces of evaluation data among 1,000 pieces of evaluation data in total, the model evaluation unit 810-5 may evaluate that the trained data recognition model is not suitable.

If the number of trained data recognition models is more than one, the model evaluation unit 810-5 may evaluate whether or not each of the trained data recognition models satisfies the predetermined criterion, and determine a model satisfying the predetermined criterion as a final data recognition model. In this case, if the number of models satisfying the predetermined criterion is more than one, the model evaluation unit 810-5 may determine any one or a predetermined number of models set in advance in the order of high evaluation grades as a final data recognition model.

At least one of the data obtaining unit 810-1, the preprocessing unit 810-2, the learning data selection unit 810-3, the model learning unit 810-4, and the model evaluation unit 810-5 described above may be implemented as a software module or may be produced in a form of at least one hardware chip and mounted on an electronic device. For example, at least one of the data obtaining unit 810-1, the preprocessing unit 810-2, the learning data selection unit 810-3, the model learning unit 810-4, and the model evaluation unit 810-5 may be produced in a form of a dedicated hardware chip for artificial intelligence (AI) or may be produced as a part of a general-purpose processor (e.g., CPU or application processor) or a graphic dedicated processor (e.g., GPU) and mounted on various electronic devices described above.

In addition, the data obtaining unit 810-1, the preprocessing unit 810-2, the learning data selection unit 810-3, the model learning unit 810-4, and the model evaluation unit 810-5 may be mounted on one electronic device or may be mounted on separate electronic devices, respectively. For example, some of the data obtaining unit 810-1, the preprocessing unit 810-2, the learning data selection unit 810-3, the model learning unit 810-4, and the model evaluation unit 810-5 may be included in the electronic device and the others thereof may be included in a server.

In addition, at least one of the data obtaining unit 810-1, the preprocessing unit 810-2, the learning data selection unit 810-3, the model learning unit 810-4, and the model evaluation unit 810-5 may be implemented as a software module. If at least one of the data obtaining unit 810-1, the preprocessing unit 810-2, the learning data selection unit 810-3, the model learning unit 810-4, and the model evaluation unit 810-5 is implemented as a software module (or program module including an instruction), the software module may be stored in non-transitory computer readable media which are readable by a computer. In such a case, the at least one software module may be provided by an operating system (O/S) or provided by a predetermined application. In addition, a part of the at least one software module may be provided by the operating system (O/S) and the other part thereof may be provided by the predetermined application.

Figure 10:
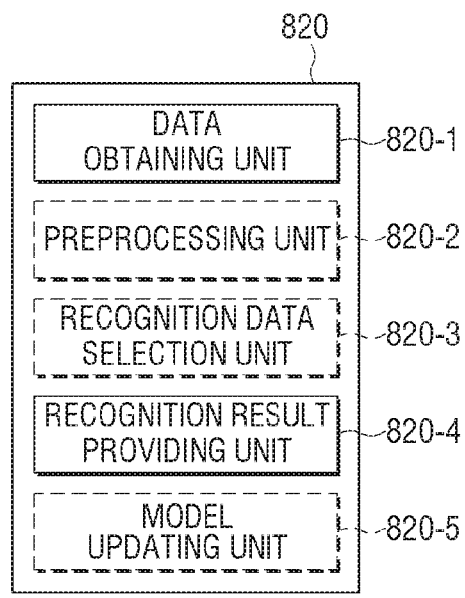

FIG. 10 is a block diagram of the data recognition unit 820 according to an embodiment.

Referring to FIG. 10, the data recognition unit 820 according to an embodiment may include a data obtaining unit 820-1 and a recognition result providing unit 820-4. In addition, the data recognition unit 820 may further optionally include at least one of a preprocessing unit 820-2, a recognition data selection unit 820-3, and a model updating unit 820-5.

The data obtaining unit 820-1 may obtain recognition data for determining the situation of the single user or the relationship between the plurality of users.

The recognition result providing unit 820-4 may determine the situation of the single user or the relationship between the plurality of users by applying the data obtained by the data obtaining unit 820-1 to the trained data recognition model as input values. The recognition result providing unit 820-4 may provide a recognition result according to a recognition purpose of the data. In addition, the recognition result providing unit 820-4 may provide a recognition result obtained by applying data preprocessed by the preprocessing unit 820-2 which will be described later to the trained data recognition model as an input value. In addition, the recognition result providing unit 820-4 may provide the recognition result by applying data selected by the recognition data selection unit 820-3 which will be described later to the data recognition model as an input value.

The data recognition unit 820 may further include the preprocessing unit 820-2 and the recognition data selection unit 820-3 in order to improve a recognition result of the data recognition model or save resources or time necessary for providing the recognition result.

The preprocessing unit 820-2 may preprocess the data obtained by the data obtaining unit 820-1 in order to use the data in the recognition for determining the situation of the single user or the relationship between the plurality of users.

The preprocessing unit 820-2 may process the obtained data in a predefined format so that the recognition result providing unit 820-4 easily uses the data for determining the situation of the single user or the relationship between the plurality of users. In particular, according to an embodiment of the disclosure, the data obtaining unit 820-1 may obtain user data (voice data or image data) in order to determine the situation of the single user or the relationship between the plurality of users and the preprocessing unit 820-2 may preprocess the user data in a predefined format as described above.

The recognition data selection unit 820-3 may select recognition data necessary for determining the situation of the single user or the relationship between the plurality of users among the preprocessed data pieces. The selected recognition data may be provided to the recognition result providing unit 820-4. The recognition data selection unit 820-3 may select recognition data necessary for determining the situation of the single user or the relationship between the plurality of users among the preprocessed data according to predetermined selection criteria. In addition, the recognition data selection unit 820-3 may select data according to the predetermined selection criteria by the training of the model training unit 810-4.

The model updating unit 820-5 may control the data recognition model to be updated based on the evaluation of the recognition result provided by the recognition result providing unit 820-4. For example, the model updating unit 820-5 may control the model learning unit 810-4 to update the data recognition model by providing the recognition result provided by the recognition result providing unit 820-4 to the model learning unit 810-4.

At least one of the data obtaining unit 820-1, the preprocessing unit 820-2, the recognition data selection unit 820-3, the recognition result providing unit 820-4, and the model updating unit 820-5 in the data recognition unit 820 may be implemented as a software module or may be produced in a form of at least one hardware chip and mounted on the electronic device. For example, at least one of the data obtaining unit 820-1, the preprocessing unit 820-2, the recognition data selection unit 820-3, the recognition result providing unit 820-4, and the model updating unit 820-5 may be produced in a form of a dedicated hardware chip for artificial intelligence (AI) or may be produced as a part of a general-purpose processor (e.g., CPU or application processor) or a graphic dedicated processor (e.g., GPU) and mounted on various electronic devices described above.

In addition, the data obtaining unit 820-1, the preprocessing unit 820-2, the recognition data selection unit 820-3, the recognition result providing unit 820-4, and the model updating unit 820-5 may be mounted on one electronic device or may be mounted on separate electronic devices, respectively. For example, some of the data obtaining unit 820-1, the preprocessing unit 820-2, the recognition data selection unit 820-3, the recognition result providing unit 820-4, and the model updating unit 820-5 may be included in one electronic device and the other one thereof may be included in a server.

In addition, at least one of the data obtaining unit 820-1, the preprocessing unit 820-2, the recognition data selection unit 820-3, the recognition result providing unit 820-4, and the model updating unit 820-5 may be implemented as a software module. If at least one of the data obtaining unit 820-1, the preprocessing unit 820-2, the recognition data selection unit 820-3, the recognition result providing unit 820-4, and the model updating unit 820-5 is implemented as a software module (or program module including an instruction), the software module may be stored in non-transitory computer readable media which are readable by a computer. In such a case, the at least one software module may be provided by an operating system (O/S) or provided by a predetermined application. In addition, a part of the at least one software module may be provided by the operating system (O/S) and the other part thereof may be provided by the predetermined application.

Figure 11:
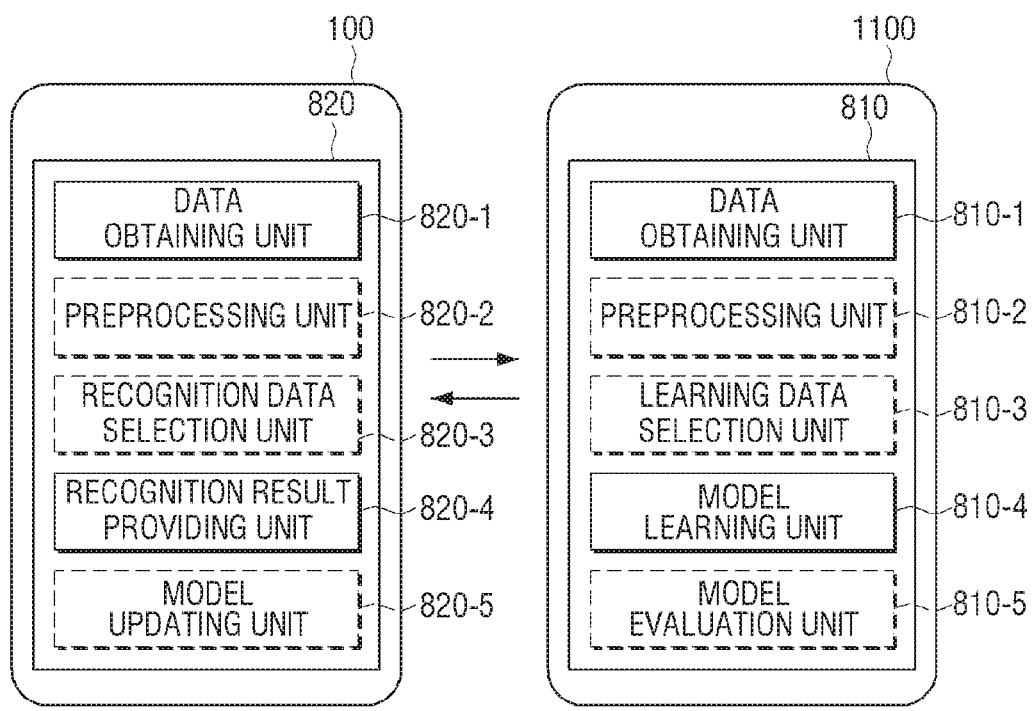

FIG. 11 is a view illustrating an example of training and recognizing data by linking the electronic device 100 and a server 1100 to each other according to an embodiment.

Referring to FIG. 11, the server 1100 may perform the training of criteria for determining the situation of the single user or the relationship between the plurality of users, and the electronic device 100 may determine the situation of the single user or the relationship between the plurality of users based on the training result by the server 1100.

In such a case, the model learning unit 810-4 of the server 1100 may perform the training of criteria for determining which data is to be used for determining the situation of the single user or the relationship between the plurality of users or how the situation of the single user or the relationship between the plurality of users is to be determined by using the data. The model learning unit 810-4 may perform the training of the criteria for determining the situation of the single user or the relationship between the plurality of users by obtaining data to be used for the training and applying the obtained data to the data recognition model which will be described later.

In addition, the recognition result providing unit 820-4 of the electronic device 100 may determine the situation of the single user or the relationship between the plurality of users by applying the data selected by the recognition data selection unit 820-3 to the data recognition model generated by the server 1100. Specifically, the recognition result providing unit 820-4 may transmit the data selected by the recognition data selection unit 820-3 to the server 1100 and request the server 1100 to determine the situation of the single user or the relationship between the plurality of users by applying the data selected by the recognition data section unit 820-3 to the recognition model. In addition, the recognition result providing unit 820-4 may receive information regarding the situation of the single user or the relationship between the plurality of users determined by the server 1100 from the server 1100. For example, when the user data selected by the recognition data selection unit 820-3 is transmitted to the server 1100, the server 1100 may apply the user data to the data recognition model stored in advance and transmit information regarding the situation of the single user or the relationship between the plurality of users to the electronic device 100.

In addition, the recognition providing unit 820-4 of the electronic device 100 may receive the recognition model generated by the server 1100 from the server 1100 and determine the situation of the single user or the relationship between the plurality of users by using the received recognition model. In such a case, the recognition result providing unit 820-4 of the electronic device 100 may determine the situation of the single user or the relationship between the plurality of users by applying the data selected by the recognition data selection unit 820-3 to the received data recognition model. For example, the electronic device 100 may receive and store the data recognition model from the server 1100 and determine the situation of the single user or the relationship between the plurality of users by applying the user data selected by the recognition data selection unit 820-3 to the data recognition model received from the server 1100.

Figure 12:
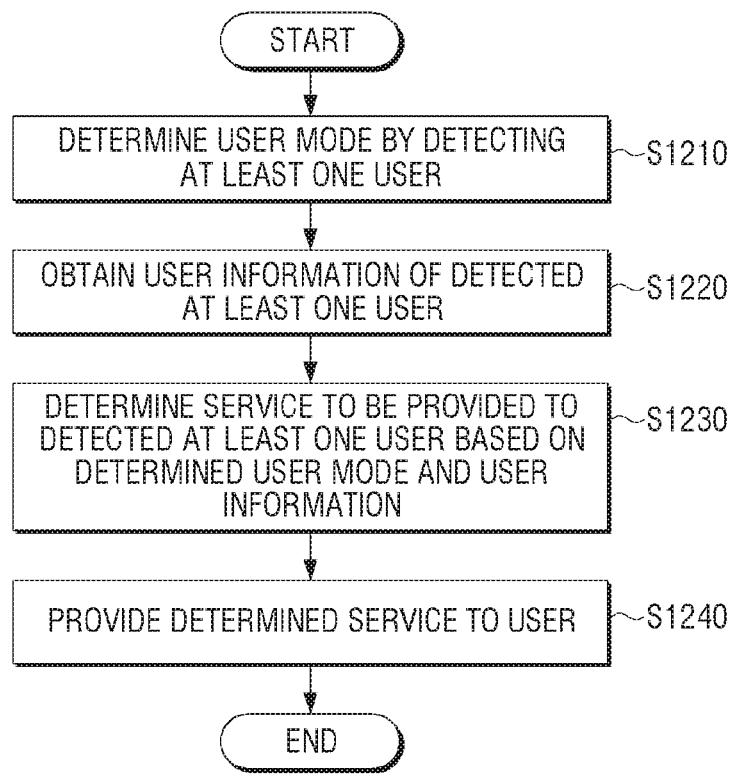
FIG. 12 is a flowchart for explaining a method for controlling the electronic device according to an embodiment.

FIG. 12 is a flowchart for explaining a method for controlling the electronic device according to an embodiment of the disclosure.

The electronic device 100 may determine a user mode by detecting at least one user (S1210). The first user mode may be a user mode of a single user and the second user mode may be a user mode for a plurality of users.

The electronic device 100 may obtain user information of the detected at least one user (S1220). As described above, the user information may include image information, voice information, motion information, movement information, and the like of the user information in a broad sense may include various pieces of context information around the user.

The electronic device 100 may determine a service to be provided to the detected at least one user based on the determined user mode and the user information (S1230). The electronic device 100 may provide the determined service to the user (S1240).

However, although it is described that all of the components configuring the embodiment of the disclosure are combined into one or operated in combination, the disclosure is not limited to such an embodiment. That is, one or more of all of the components may be selectively combined for operation, within the scope of the object of the disclosure. In addition, all of the components may be implemented as independent hardware respectively, but some or all of the components may be selectively combined to be implemented as a computer program having a program module executing some or the entire functions combined in one or a plurality of hardware.

At least a part of the device (e.g., modules or functions thereof) or the method (e.g., operations) according to the embodiments may be implemented with instructions stored in the non-transitory computer readable media that is able to read by a computer in a form of program modules. When the instruction is executed by the processor (e.g., processor 130), the processor may execute a function corresponding to the instruction.

The program may be stored in the non-transitory computer readable media and read and executed by a computer to realize the embodiments of the disclosure.

The non-transitory computer readable media may be a medium storing data semi-permanently and readable by a machine, may include a register, a cache, or a buffer, and does not include a transmission medium such as a signal or current.

Specifically, the programs may be stored and provided in the non-transitory computer readable media such as a CD, a DVD, a hard disk, a Blu-ray disc, a USB, an internal memory (e.g., memory 150), a memory card, and a ROM or a RAM.

In addition, the method according to the above embodiments may be provided in a computer program product.

The computer program product may include a S/W program, a storage medium readable by a computer storing the S/W program, or a commercially available product exchanged between a seller and a purchaser.

For example, the computer program product may include a product (e.g., downloadable application) in a form of the S/W program electrically distributed through the electronic device, a manufacturer of the electronic device, or electronic markets (e.g., Google Play™ or App Store™). For electronic distribution, at least some of the S/W programs may be stored in a storage medium or temporarily generated. In such a case, the storage medium may be a storage medium of a manufacturer, a server of an application store, or a relay server.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. A method for controlling an electronic device, the method comprising:
   obtaining, by the electronic device, image data regarding persons around the electronic device;
   providing, by the electronic device, a display based on the obtained image data;
   identifying, by the electronic device, a number of persons in the obtained image data;
   determining, by the electronic device, a user mode of the electronic device based on the identified number of persons; and
   performing, by the electronic device, a camera-related operation of the electronic device according to the determined user mode.

2. The method claim 1, further comprising:
   based on identifying a first number of persons, determining, by the electronic device, a first user mode; and
   based on identifying a second number of persons, determining, by the electronic device, a second user mode different from the first user mode.

3. The method of claim 1, wherein the camera-related operation performed by the electronic device comprises driving a component of the electronic device.

4. The method of claim 1, further comprising:
   determining a relationship between persons in the obtained image data.

5. The method of claim 4, wherein the relationship is determined based on facial features of the persons.

6. The method of claim 1, wherein the image data is obtained by a camera of the electronic device.

7. The method of claim 1, wherein the electronic device comprises a smartphone.

8. An electronic device comprising:
   a camera;
   a display; and
   a processor configured to:
      obtain image data regarding persons around the electronic device, using the camera;
      provide a display on the display based on the obtained image data;
      identify a number of persons in the obtained image data;
      determine a user mode of the electronic device based on the identified number of persons; and
      control a camera-related operation of the electronic device according to the determined user mode.

9. The device of claim 8, wherein the processor is further configured to:
   based on identifying a first number of persons, determine a first user mode; and
   based on identifying a second number of persons, determine a second user mode different from the first user mode.

10. The device of claim 8, wherein the camera-related operation controlled by the processor comprises driving a component of the electronic device.

11. The device of claim 8, wherein the processor is further configured to:
   determine a relationship between persons in the obtained image data.

12. The device of claim 11, wherein the relationship is determined based on facial features of the persons.

13. The device of claim 8, comprising a smartphone.

14. A non-transitory computer-readable recording medium storing instructions which, when executed by a processor of an electronic device configure the processor to perform operations comprising:
   obtaining image data regarding persons around the electronic device;
   providing a display based on the obtained image data;
   identifying a number of persons in the obtained image data;
   determining a user mode of the electronic device based on the identified number of persons; and
   performing a camera-related operation of the electronic device according to the determined user mode.

15. The non-transitory computer-readable storage medium of claim 14, wherein the operations further comprise:
   based on identifying a first number of persons, determining a first user mode; and
   based on identifying a second number of persons, determining a second user mode different from the first user mode.

16. The non-transitory computer-readable storage medium of claim 14, wherein the camera-related operation performed by the electronic device comprises driving a component of the electronic device.

17. The non-transitory computer-readable storage medium of claim 14, wherein the operations further comprise:
   determining a relationship between persons in the obtained image data.

18. The non-transitory computer-readable storage medium of claim 17, wherein the relationship is determined based on facial features of the persons.

19. The non-transitory computer-readable storage medium of claim 14, wherein the image data is obtained by a camera of the electronic device.

20. A smartphone comprising the non-transitory computer-readable storage medium of claim 14.

21. The device of claim 8, wherein the processor comprises an artificial intelligence (AI) processor.

22. The device of claim 21, wherein the AI processor is configured to at least control the camera-related operation.

23. The device of claim 21, wherein the AI processor is configured to identify a number of persons in the obtained image data.

24. A method for controlling a smartphone including a camera, a display, and a processor, the method comprising:
   obtaining, by the camera of the smartphone, image data regarding persons around the smartphone;
   providing, by the display of the smartphone, a display based on the obtained image data;
   identifying, by the processor of the smartphone, a number of persons in the obtained image data;
   determining, by the processor of the smartphone, a user mode of the smartphone based on the identified number of persons; and
   performing, by the processor of the smartphone, camera-related operation of the smartphone according to the determined user mode.

* * * * *